Jan. 10, 1933.   C. S. HANSEN   1,893,621
MECHANICAL MOVEMENT
Filed March 14, 1931   2 Sheets-Sheet 1
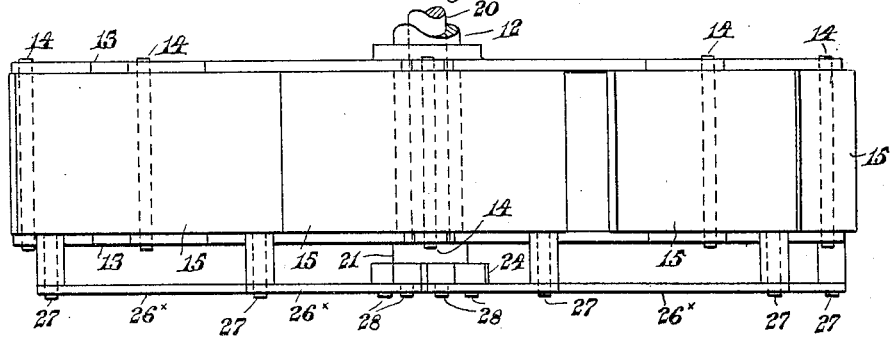
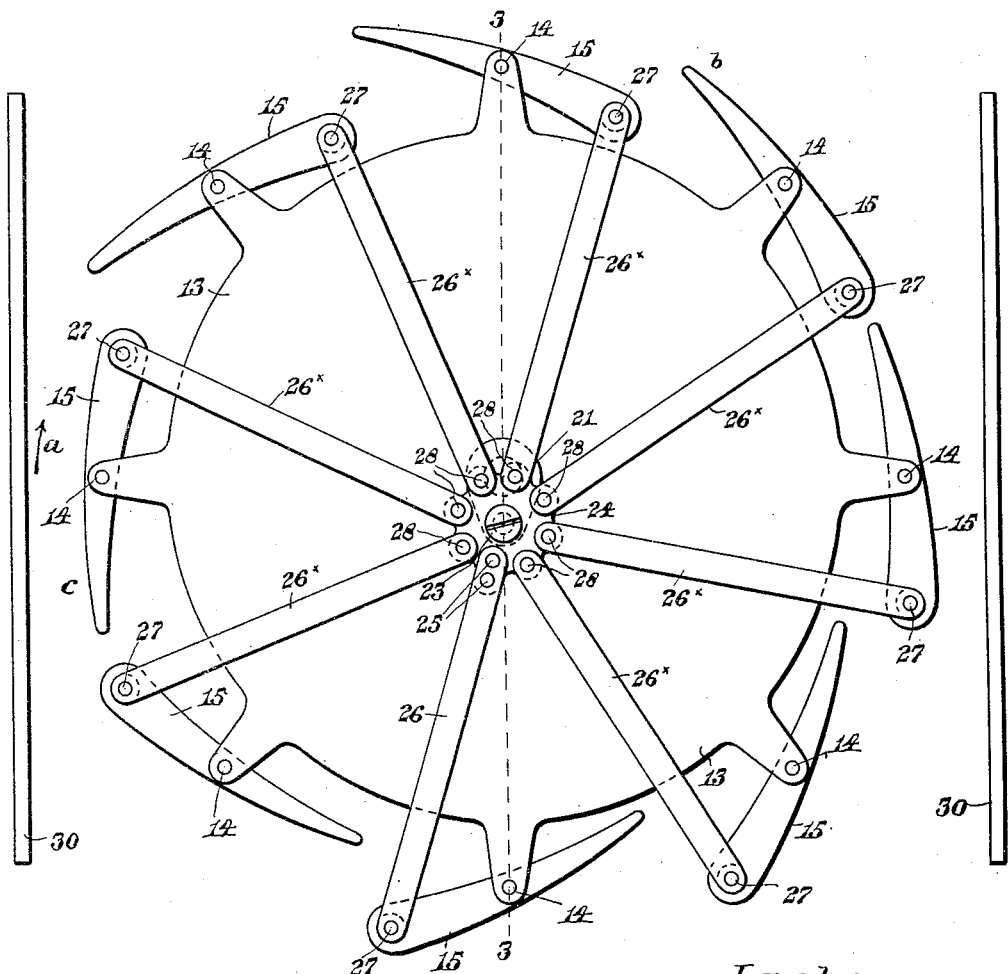
Inventor:
Christian S. Hansen,
by Walter E. Lombard,
Atty.

Patented Jan. 10, 1933

1,893,621

UNITED STATES PATENT OFFICE

CHRISTIAN S. HANSEN, OF MEDFORD, MASSACHUSETTS, ASSIGNOR OF ONE-HALF TO OTTO W. H. WENDLER, OF MELROSE, MASSACHUSETTS

MECHANICAL MOVEMENT

Application filed March 14, 1931. Serial No. 522,640.

This invention relates to mechanical movements and has for its object the production of a new device embodying novel mechanical mechanism, said device being adapted to rotate about a shaft and during said rotation continuously move a plurality of pivoted blades into dissimilar positions about their pivots by means of links articulated to said blades and to a wheel revoluble about a pin at the outer end of a crank, means also being provided for varying the position of said crank.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a plan of a device embodying the principles of the present invention.

Figure 2 represents an elevation of the same, and

Similar characters indicate like parts throughout the several figures of the drawings.

Figure 3:
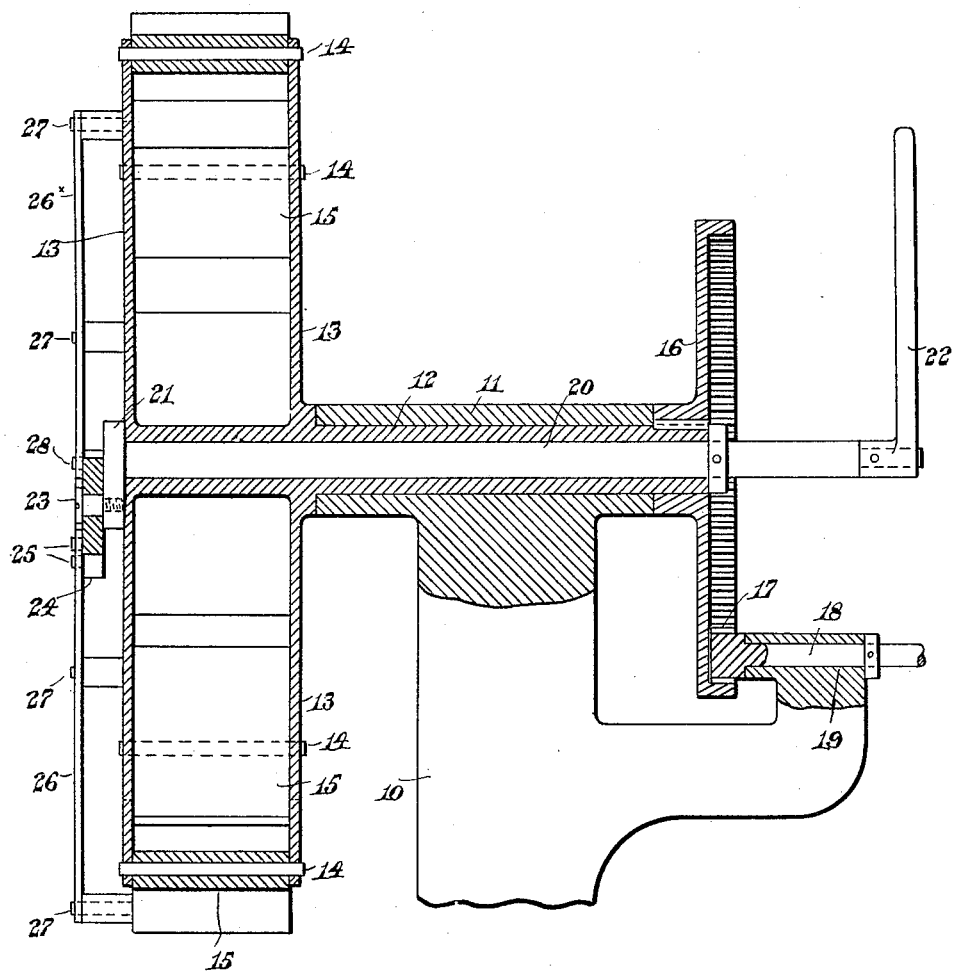
Figure 3 represents a vertical section of same on line 3, 3 on Fig. 2.

In the drawings, 10 is a support having a bearing 11 at the upper end thereof which has revolubly mounted therein the hub 12 of a flanged member 13.

Mounted in the flanges of the member 13 and equi-distant apart are a plurality of pins 14 on each of which is mounted a curved blade 15, these pins 14 extending through the blades 15 midway of their length.

The pins 14 are equi-distant from the axis of hub 12 and parallel thereto.

To the outer end of the hub 12 is keyed an internal gear 16 with the teeth of which meshes a pinion 17 on the end of a rotatable shaft 18 mounted in a bearing 19.

This rotatable shaft 18 may be revolved at any desired speed by a motor.

Extending through the hub 12 is a shaft 20 having a crank 21 at one end and an actuating lever 22 at its opposite end.

By actuating the lever 22 the crank 21 may be moved about the axis of said shaft 20 into any desired position and locked in this position by any suitable mechanism.

This locking mechanism forms no part of the present invention and is therefore not illustrated in the drawings.

Near the outer end of the crank 21 is a headed cylindrical pin 23 on which is loosely mounted a disk 24.

By moving the shaft 20 about its axis the position of the pin 23 may be varied as desired.

Fixedly secured at 25 to the disk 24 is a bar or link 26, the outer end of which is pivoted at 27 to the front end of a blade 15, all of the other blades 15 having their front ends pivotally connected at 27 to links 26x, the opposite ends of said links 26x being pivotally connected at 28 to the disk 24.

The blades 15 are curved as indicated in Fig. 2 with their front ends larger than the rear ends thereof, as shown in the drawings.

As will be seen by reference to Fig. 2 of the drawings the blades 15 are all in dissimilar positions and as the flanged wheel 13 is revolved in the direction of the arrow a on Fig. 2 of the drawings the various blades 15 will be moved successively from the innermost position shown at the top of said figure to the outermost position, as shown at the bottom of said figure.

The blades 15 will always be in dissimilar positions during the rotation of the wheel 13.

As the blades move forwardly from the position indicated at c to the position indicated at b, the outer faces of said blades will strike the element being acted upon by said blades and force this element outwardly, leaving a partial vacuum behind them, and while the blades are moving from the position b, to the position c, the inner faces of the blades will force the element inwardly.

In other words, during one half of the rotation of the wheel 13 the outer faces of the blades 15 will force the element in one direction and during the other half of the rotation of said wheel the inner faces will force the element in the same direction.

The element being acted upon may be any gas or liquid.

As shown in the drawings the outermost position of the blades 15 will be at the bottom of said Fig. 2 and the innermost position at the top of said figure but by making a quarter turn of the shaft 20 this outermost position of the blades may be shifted at right angles to the position indicated in the drawings with the innermost position of the blades directly opposite thereto.

This mechanism may be utilized in many ways, as for instance, the blades 15 may be of great width and of light metal and several devices thus constructed used in connection with an airship to raise or lower the same and move the airship in any direction.

When the wheel 13 is revolving in the direction of the arrow a on Fig. 2, the element being acted upon will be forced downwardly and if the crank 21 is moved into vertical position above the shaft 20 the element will be forced upwardly.

The same mechanism with the blades made of heavier metal and the shaft 20 in a vertical position could be used in connection with a boat to propel the same when the blades are submerged in water.

In some cases it is preferred to position the member 13 within a walled passage 30, as indicated in Fig. 2.

This is particularly true when the device is used in propelling boats.

While for convenience a member or wheel 13 is shown with two flanges, it is obvious that a single flange may be used with blades 15 on opposite sides thereof and pivoted thereto.

It is also self-evident that the wheel or member 13 may be made with spokes between the rim and hub without departing from the invention.

When the device is used operating in air it is preferable to have the blades 15 formed substantially as shown in the drawings but when operating in water or other liquid the blades may be made with both ends comparatively sharp.

When the wheel 13 is rotating in air the blades 15 at the bottom of Fig. 2 have a pulling effect while those at the top of said figure have a pushing effect.

The direction of this pull and push is determined by the position of the crank 21, the pull being always in the direction that the crank 21 is pointed.

When the wheel is rotated horizontally in water within a walled passage 30, there is no pulling or pushing effect when the crank 21 is pointed toward either wall of passage 30, the wheel 13 under such conditions being in neutral position.

It is believed that the operation and many advantages of the invention will be fully understood without further description.

Having thus described my invention, I claim:

1. The combination of a rotatable member having a tubular hub; a support for said hub; a shaft extending through said hub; blades pivoted at their centers to the periphery of said member; a crank on one end of said shaft having a lateral cylindrical pin at the outer end thereof; a disk loosely mounted on said pin; and links extending from said disk and pivotally connected to the front ends of said blades, one of said links being fixedly secured to said disk.

2. The combination of a rotatable unitary flanged member having a tubular hub extending therefrom; a support having a bearing for said hub; a shaft extending through said hub; means at the outer end of said hub for rotating said member; a crank on one end of said shaft; a lever on the opposite end of said shaft; a laterally extending pin on the outer end of said crank; a disk loosely mounted on said pin; a link fixedly secured to said disk and radiating therefrom; a plurality of other links pivotally connected to said disk; a plurality of curved blades pivoted at their centers to the periphery of said flanged member; and pivotal connections between the outer ends of said links and the front ends of said blades adapted, during the rotation of said member, to impart limited movement of the opposite ends of said blades toward and from the periphery of said member.

3. The combination of a rotatable member provided with two parallel peripheral flanges; blades interposed between said flanges and pivoted at their centers thereto near the periphery thereof; means connected to one end of each blade for retaining said blades in dissimilar position and simultaneously moving them about their pivots during the rotation of said member; and means for reversing the operation of said blades including an actuating shaft extending through said rotatable member.

4. The combination of a rotatable member having a peripheral flange; blades pivoted at their centers to the side face of said flange near the periphery thereof; a disk loosely mounted on a supporting pin; unitary links radiating from said disk and pivotally connected to the front ends of said blades; and means extending through said rotatable member for varying the position of said pin about the axis of said member.

5. The combination of a rotatable member having a peripheral flange; blades pivoted at their centers to the face of said flange near the periphery thereof; a disk loosely mounted on a supporting pin; unitary links radiating from said disk and pivotally connected to the front ends of said blades, one of said links being fixedly secured to said disk; and means extending through said rotatable member for varying the position of said pin about the axis of said member.

6. The combination of a rotatable member having a peripheral flange; a plurality of pivot pins extending perpendicularly to the face of said flange; curved blades pivotally mounted at their centers on said pivot pins and tapering toward the rear ends thereof; a supporting pin; a disk loosely mounted thereon; unitary links extending from said disk and pivotally connected to the front ends of said blades; and means extending through said rotatable member for varying the position of said pin about the axis of said member.

7. The combination of a rotatable member having a tubular hub and a peripheral flange; a support in which said hub is adapted to rotate; a shaft extending through said hub; blades pivoted at their centers to the face of said flange near the periphery thereof; a lateral cylindrical pin offset from the axis of said shaft and rotatable therewith; a disk loosely mounted on said pin; unitary links extending from said disk and pivotally connected to the front ends of said blades; means for rotating said member; and means for moving said shaft about its axis to vary the position of said pin.

8. The combination of a rotatable member having a tubular hub and a peripheral flange; a support in which said hub is adapted to rotate; a shaft extending through said hub; blades pivoted at their centers to the periphery of said flange by pins extending widthwise of said blade and perpendicular to said flange; means for imparting rotary movement to said member; a pin offset from the axis of said shaft and revoluble therewith; a disk loosely mounted on said pin; unitary links extending from said disk and pivotally connected to the front ends of said blades; and means extending through said hub for moving said shaft about its axis to vary the position of said pin.

9. The combination of a rotatable member having a tubular hub and a peripheral flange; a walled passage in which said member is positioned; a support in which said hub is adapted to rotate; a shaft extending through said hub; blades pivoted at their centers to the periphery of said member by pins perpendicular to said flange and extending widthwise of said blades; means for rotating said member; a cylindrical pin at one end of said shaft offset from the axis thereof and movable therewith; a disk loosely mounted on said pin; unitary links extending from said disk and pivotally connected to the front ends of said blades; and means at the opposite end of said shaft for moving it about its axis to vary the position of said pin.

10. The combination of a rotatable member having a tubular hub and a peripheral flange; a support in which said hub is adapted to rotate; a shaft extending through said hub; blades pivoted at their centers on pins perpendicular to said flange and extending widthwise of the blades; a crank on one end of said shaft having a lateral cylindrical pin at the outer end thereof; a disk loosely mounted on said pin; unitary links extending from said disk and pivotally connected to the front ends of said blades; and means at the opposite end of said shaft for moving it about its axis to vary the position of said pin about the axis of said shaft.

11. The combination of a rotatable member having a tubular hub and a peripheral flange; a support in which said hub is adapted to rotate; a shaft extending through said hub; pins perpendicular to the face of said flange; blades having transverse bearings at their centers to receive said pins; a crank on one end of said shaft having a lateral offset cylindrical pin at the outer end thereof; a disk loosely mounted on said pin; unitary links extending from said disk and pivotally connected to the front ends of said blades; and means at the opposite end of said shaft for moving it about its axis.

12. The combination of a rotatable member having a tubular hub and a peripheral flange; pins perpendicular to the face of said flange; a support in which said hub is adapted to rotate; a shaft extending through said hub; curved blades pivotally mounted on said pins at their centers, said pins extending widthwise of the blades; a crank on one end of said shaft having a lateral cylindrical pin at the outer end thereof; a disk loosely mounted on said pin; and links extending from said disk and pivotally connected to the front ends of said blades.

13. The combination of a rotatable member having a tubular hub and a peripheral flange; pins perpendicular to said flange and near the periphery thereof; a support in which said hub is adapted to rotate; a shaft extending through said hub; blades pivotally mounted on said pins at their centers, said pins extending widthwise of the blades; a crank on one end of said shaft having a lateral cylindrical pin at the end thereof; a disk loosely mounted on said pin; unitary links extending from said disk and pivotally connected to the front ends of said blades; and means for imparting rotary movement to said member.

14. The combination of a rotatable member having a tubular hub and a peripheral flange; pins perpendicular to said flange and near the periphery thereof; a support in which said hub is adapted to rotate; a shaft extending through said hub; blades pivotally mounted on said pins at the centers thereof, said pins extending widthwise of said blades; a crank on one end of said shaft having a lateral cylindrical pin at the outer end thereof; a disk loosely mounted on said pin; unitary links extending from said disk and pivotally connected to the front ends of said blades; an internal gear on the hub of said member; and a rotatable pinion meshing with the teeth of said gear and adapted to impart rotary movement to said flanged member.

15. The combination of a rotatable member having a tubular hub and a peripheral flange; pins perpendicular to said flange and near the periphery thereof; a support in which said hub is adapted to rotate; a shaft extending through said hub; blades pivotally mounted at their centers on said pins, which pins extend widthwise of the blades; a crank on one end of said shaft having a lateral cylindrical pin in the end thereof; a disk loosely mounted on said pin; unitary links extending from said disk and pivotally connected to the front ends of said blade; and means extending through said hub for varying the position of said crank pin about the axis of said shaft.

16. The combination of a hollow rotatable member provided with a peripheral flange, a support in which said member is adapted to rotate; blades pivoted at their centers to said flange near the periphery thereof; a crank rotatable about the axis of said member; a cylindrical pin extending laterally from the outer end of said crank; a disk loosely mounted on said pin; unitary links extending from said disk and pivotally connected to the front ends of said blades to vary the positions thereof during the rotation of said blade-supporting member, one of said links being fixedly secured to said disk; and means extending through said hollow member for rotating said crank and adjusting the position of said pin in a path concentric to the axis of said member.

Signed by me at Medford, Massachusetts, this 10th day of March, 1931.

CHRISTIAN S. HANSEN.